United States Patent [19]
Bond

[11] 4,113,233
[45] Sep. 12, 1978

[54] SEAT STRUCTURE FOR GATE VALVES

[75] Inventor: John A. Bond, Houston, Tex.

[73] Assignee: ACF Industries, Incorporated, New York, N.Y.

[21] Appl. No.: 841,225

[22] Filed: Oct. 11, 1977

[51] Int. Cl.² .............................................. F16K 3/00
[52] U.S. Cl. .................................. 251/328; 251/196; 251/363
[58] Field of Search ...................... 251/328, 363, 196

[56] References Cited
U.S. PATENT DOCUMENTS

| 2,819,035 | 1/1958 | Graham | 251/363 X |
| 3,006,599 | 10/1961 | Eckert | 251/328 X |
| 3,929,316 | 12/1975 | Guthrie | 251/328 X |
| 4,055,325 | 10/1977 | Vyvial | 251/328 |
| 4,067,542 | 1/1978 | Morrison | 251/328 |

Primary Examiner—Harold W. Weakley
Attorney, Agent, or Firm—Eugene N. Riddle

[57] ABSTRACT

A non-floating seat structure for an expanding gate valve in which a seat ring is pressed within a body recess and a sealing member is inserted in a groove between a rear face of the seat ring and an opposed wall defining the recess to form a fluid-tight barrier. The groove for the sealing member is of a generally rectangular cross-section and is formed by a counterbore in the valve body and a rearwardly extending inner lip on the seat ring which abuts the recess wall when the seat ring is pressed within the body recess.

5 Claims, 3 Drawing Figures

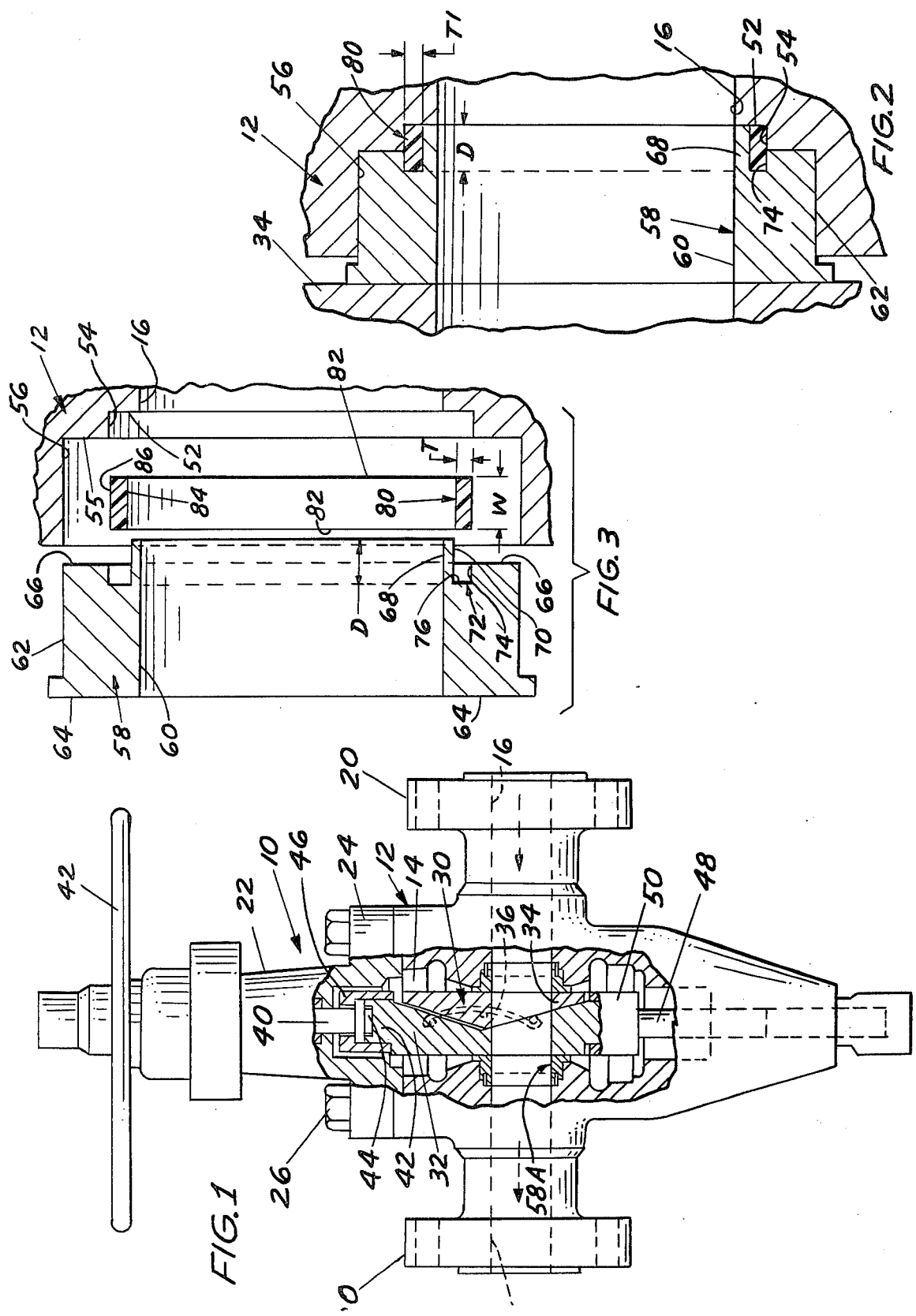

SEAT STRUCTURE FOR GATE VALVES

BACKGROUND OF THE INVENTION

U.S. Pat. No. 3,929,316 dated Dec. 30, 1975 and entitled "Non-Floating Seat Structure for Expanding Gate Valves" shows an expanded gate valve having a valve body with annular recesses in which annular seats are pressed. An annular seal is positioned within facing aligned grooves in the back face of the seat rings and the opposed recess walls with the seal being of a cross-sectional area before insertion slightly larger than the cross-sectional area of the two opposed grooves thereby compressing the seals when the seals are pressed into position. This arrangement provides a fluid-tight barrier to fluid pressure tending to seep behind the seats and float or move the seats toward the gate. The arrangement shown in the above mentioned patent has functioned in a satisfactory manner but it is sometimes difficult and costly to machine the annular grooves in the valve body as limited space particularly in small diameter valves is provided for the machining of the annular grooves in the recess walls from the valve chamber.

DESCRIPTION OF THE PRESENT INVENTION

The present invention is directed to an improvement in which the body recesses facing the valve chamber and extending about the flow passages are each defined by a pair of stepped counterbores having different diameters and a seat ring fitting within the stepped counterbores. The seat ring has an inner extension or lip extending from the rear face of the seat ring with the inner periphery thereof forming a smooth continuation of the flow passage and the outer periphery thereof defining the inner side of an annular groove in the seat ring. The groove in the seat ring and the lip extending from the rear face are in axial alignment with the small diameter counterbore in the valve body. The walls defining the small diameter counterbore and the groove in the seat ring form an annular pocket of a rectangular cross-section. A resilient seal of a generally rectangular cross-section is positioned and compressed within the pocket to fill the entire cross-sectional area of the pocket to form a fluid-tight barrier in the same manner as shown in the above identified U.S. Pat. No. 3,929,316. The valve body is easily machined to form the stepped counterbores about each of the flow passages at the valve chamber in a minimum of time. The above arrangement is particularly adapted for expanding gate valves designed for high pressures, such as 20,000 psi for example.

BRIEF DESCRIPTION OF THE DRAWINGS

In the accompanying drawings in which one possible embodiment of the invention is illustrated, FIG. 1 is an elevational view, partly in section, of a hydraulically balanced gate valve structure having an expanded gate valve assembly therein with the seat structure forming the present invention;

FIG. 2 is an enlarged fragment of FIG. 1 showing the seat ring in seated position within the recess formed in the valve body and having the seal compressed into the entire void area of the pocket; and FIG. 3 is an exploded view of the structure in FIG. 2 with the seat ring and seal shown removed from the valve body.

Referring now to the drawings for a better understanding of the invention, a gate valve structure generally indicated at 10 includes a valve body generally designated 12 having a valve chamber 14 therein. An inlet flow passage 16 and an outlet flow passage 18 communicate with valve chamber 14. Flanges 20 on the ends of valve body 12 may be suitably connected to a pipeline or other fluid system as is well known in the art. A bonnet indicated at 22 has a lower flange 24 which is secured by suitable studs 26 to the upper end of body 12.

An expanding gate valve assembly is generally indicated at 30 and is mounted for movement between open and closed positions relative to flow passages 16 and 18. Gate valve assembly 30 includes a gate element 32 and a complementary gate segment 34. Gate element 32 has a concave V-shaped back face and segment 34 has a complementary convex V-shaped back face fitting within the V-shaped face of gate element 32. A spring 36 continuously urges segment 34 and gate element 32 toward a collapsed or retracted position. Suitable ports are arranged in gate element 32 and gate segment 34 for alignment with flow passages 16 and 18 in the open position.

An upper operating valve stem 40 has a treaded portion which is engaged by a handwheel 42. The upper end of gate element 32 has a threaded extension 42 thereon and a key 44 on the end of stem 40 fits in a longitudinal slot on extension 42. A cap 46 which receives the end of operating stem 40 is threaded on extension 42 to connect stem 40 to gate element 32.

Mounted adjacent the lower end of gate assembly 30 is a pilot or balancing stem 48. Stem 48 is connected to the lower end of gate element 32 by a cap 50 in a manner similar to the connection of upper operating stem 40. Stems 40 and 48 are of substantially the same cross-sectional area so that the areas of gate assembly 30 exposed to fluid pressure adjacent stems 40 and 48 are equal. Fluid pressure in chamber 14 above and below gate assembly 30 are therefore equalized and gate assembly 30 is hydraulically balanced. For further details of gate assembly 30 reference is made to the above mentioned U.S. Pat. No. 3,929,316 dated Dec. 30, 1975, the entire disclosure of which is incorporated by this reference.

As shown in FIGS. 2 and 3, valve body 12 has an annular recess about flow passage 16 which faces valve chamber 14 and is formed by small and large diameter stepped counterbores about flow passage 16. The small diameter counterbore defines a rear end wall 52 and an outer intermediate annular wall 54 extending in perpendicular relation to rear end wall 52. The large diameter counterbore defines an intermediate end wall 55 and an outer annular wall 56 extending in a perpendicular relation to intermediate end wall 55. A seat ring is indicated generally at 58 and has an inner peripheral surface 60 and an outer peripheral surface 62. Seat ring 58 has a front face 64 adapted to contact gate segment 30 and a rear face 66. Extending from rear face 66 is an annular extension or lip 68 having an outer peripheral surface 70. An annular groove 72 is formed in rear face 66 adjacent lip 68 and is defined by an outer side 74, an inner side formed by surface 70, and an end wall 76.

A seal generally indicated 80 has a generally rectangular cross-section defined by opposed end surfaces 82 and respective inner and outer peripheral surfaces 84 and 86. Seal 80 has a width "W" and a thickness "T". A generally rectangular pocket is formed by groove 72 and the small diameter counterbore when seat ring 58 is pressed within the recess with lip 68 abutting the adjacent rear end wall 52. The pocket is defined by rear end wall 52, outer peripheral surface 70 of lip 68, end wall 76, side 74, and annular wall 54 aligned with side 74. Before insertion of seal 80 within the rectangular pocket, the width "W" of seal 80 is greater than the depth "D" of the pocket with the proportions being such to permit compression of seal 80 without buckling but yet adequate to allow seal 80 to fill in substantially the entire void space in the pocket. Effective results have been obtained with "W" being between around 105° and 130° of the depth "D". The thickness "T" of seal 80 is less than the thickness of T1 of the pocket and satisfactory results have been obtained with thickness "T" being around 70% to 90% of thickness T1. For good results, it would be desirable that seal 80 fill at least around 80% of the total cross-sectional area of the generally rectangular pocket while 100% would be optimum, but it is very difficult to obtain 100% without a portion of seal 80 flowing between the abutting surfaces of lip 68 and rear end face 52. Highly effective results have been obtained with 90% of the total cross-sectional area of the pocket being filled with seal 80.

Upstream seat ring 58 has been described in detail. A downstream seat ring is indicated at 58A and downstream seat ring 58A is generally identical to upstream seat ring 58.

When gate assembly 30 is in a closed position and substantial upstream pressure is provided it is very common for a leakage path to occur between gate assembly, 30 and the upstream seat. Since seal 80 provides a fluid-tight barrier, only a limited portion of the entire back face 66 of upstream seat ring 58 is exposed to flow line pressure and upstream seat ring 58 is easily held in position without moving or floating outwardly toward gate segment 34. The recess receiving seat ring 58 is formed by small and large diameter counterbores which are easily made from inside flow passage 16 and define with groove 72 and lip 68 an enclosed rectangular pocket for seal 80.

What is claimed is:

1. A gate valve structure comprising a valve body having a valve chamber therein and inlet and outlet flow passages communicating with the valve chamber, a gate element slidably mounted within the valve chamber for movement between open and closed positions, said valve body having a recess about each flow passage defined by small and large diameter stepped counterbores, said small diameter counterbore forming a rear end wall and an intermediate annular wall perpendicular to the rear end wall, said large diameter counterbore forming an intermediate end wall and an outer annular wall perpendicular to the intermediate end wall;

a seat ring fitting within each recess and having inner and outer peripheral surfaces, said inner peripheral surface axially aligned with the forming a continuation of the associated flow passage and said outer peripheral surface in facing contact with said outer annular wall;

said seat ring having a rear face and a lip projecting from said rear face in abutting contact with said rear end wall, the inner peripheral surface of the lip forming a continuation of the flow passage and being coextensive with the inner peripheral surface of the seat ring, said rear face having a groove adjacent said lip with the outer peripheral surface of the lip defining the inner side of the groove, said groove defining with the small diameter counterbore a pocket of a generally rectangular cross-section;

and a deformable seal of an elongate cross-section positioned within the generally rectangular pocket, said seal filling substantially the entire cross-sectional area of the pocket when the seat is passed within the recess.

2. A gate valve structure as set forth in claim 1 wherein the deformable seal is of a generally rectangular cross-section and the elongate seal has a width between around 105% and 130% of the total depth of the pocket and a thickness between around 70% and 90% of the total thickness of the pocket.

3. A gate valve structure comprising a valve body having a valve chamber, an expanding valve assembly including a gate element and segment slidably mounted within the valve chamber for movement between open and closed positions of the gate valve structure with said gate element and segment expanding away from each other at the fully closed position, said valve body having a recess about each flow passage defined by small and large diameter stepped counterbores to define rear and intermediate stepped end walls and respective intermediate and outer stepped annular walls generally at right angles to the end walls;

a seat ring fitting within the recess for one of the flow passages and having inner and outer peripheral surfaces, said inner peripheral surface axially aligned with and forming a continuation of the associated flow passage and said outer peripheral surface in facing contact with said outer annular wall, said seat ring having a rear face and an annular groove in said rear face facing said rear end wall;

said groove defining inner and outer sides with said outer side in axial alignment with and forming a continuation of said intermediate annular wall, said seat ring having a lip projecting from the rear face of the seat ring and in abutting contact with said rear end wall, the inner peripheral surface of the lip being coextensive with the inner peripheral surface of the seat ring and the outer peripheral surface of the extension forming the inner side of said groove, said groove defining with the small diameter counterbore a pocket of a generally rectangular cross-section;

and a deformable seal of an elongate cross-section positioned within the generally rectangular pocket, said seal filling substantially the total cross-sectional area of the pocket when the seat ring is pressed within the recess.

4. A gate valve structure as set forth in claim 3 wherein the deformable seal is of a generally rectangular cross-section and the elongate seal has a width between around 105% and 130% of the total depth of the pocket and a thickness between around 70% and 90% of the total thickness of the pocket.

5. A gate valve structure as set forth in claim 4 wherein said deformable seal is formed of tetrafluoroethylene.

* * * * *